E. K. BAKER.
WHEEL FOR AUTOMOBILES.
APPLICATION FILED FEB. 11, 1911.

1,095,953.

Patented May 5, 1914.

Witnesses:

Inventor:
Erle K. Baker,
by
Attorney

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

WHEEL FOR AUTOMOBILES.

1,095,953.  Specification of Letters Patent.  Patented May 5, 1914.

Application filed February 11, 1911. Serial No. 607,997.

*To all whom it may concern:*

Be it known that I, ERLE K. BAKER, a citizen of the United States, and a resident of Chicago, Cook county, Illinois, have invented certain new and useful Improvements in Wheels for Automobiles, of which the following is a full, true, clear, and exact description, such as will enable others skilled in the art to make and use the same.

My invention relates to improvements in automobile wheels and demountable tire rims therefor.

The objects of my invention are to improve the construction, simplify the operation and lessen the cost of automobile wheels and demountable rims of the kind in which the rim is larger than the wheel and is demountably secured thereon by a number of clamping devices in the nature of wedges operating between the wheel and the rim.

A special object of my invention is to provide an automobile wheel and rim of such construction that the rim shall be automatically centered upon the wheel when placed thereon and to reduce the number of parts which it is necessary to operate and manipulate at times of mounting and demounting the rim, while at the same time providing the rim with a sufficiently large number of points of support upon the wheel to prevent detrimental distortion or bending of the rim by said clamping devices or by road shocks received while the wheel is in use.

My invention consists in the improvements hereinafter described and particularly pointed out in the claims and wherein and whereby the foregoing objects are attained.

My invention will be more readily understood by reference to the accompanying drawings forming a part of this specification, and wherein I have illustrated several preferred forms of my invention.

Figure 1:
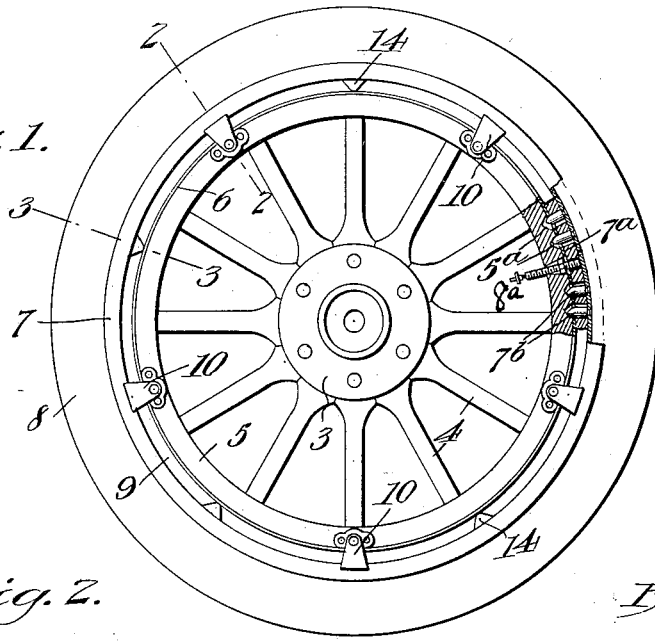
Figure 2:
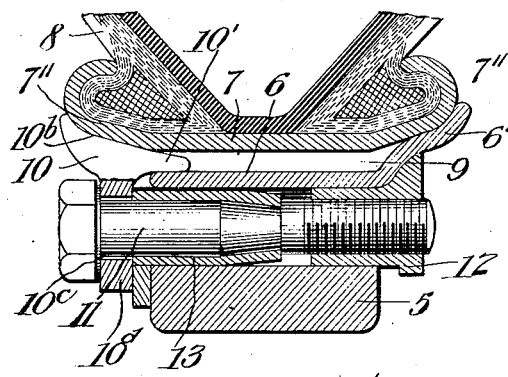
Figure 3:
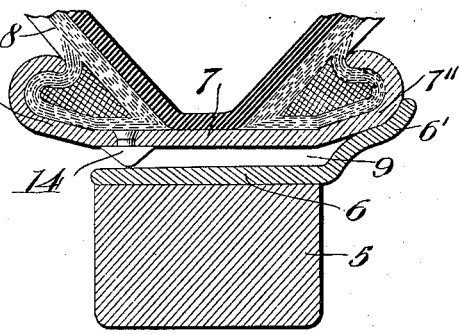
Figure 4:
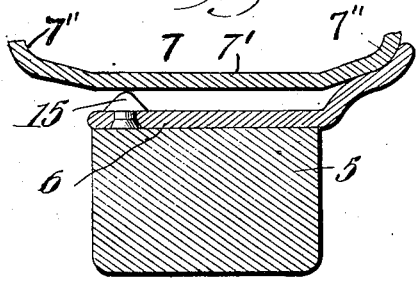
Figure 5:
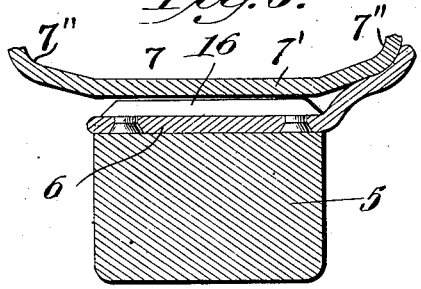

In the drawings, Figure 1 is a side elevation of an automobile wheel and demountable rim embodying my invention; Fig. 2 is an enlarged sectional view thereof on the line 2—2 of Fig. 1; Fig. 3 is a similarly enlarged cross section of the wheel and rim on the line 3—3 of Fig. 1 disclosing the supporting studs or projections of the rim; Fig. 4 is a similar cross section illustrating a modification of my invention in which I arrange or form the supporting studs or spacers upon the periphery or felly band of the wheel; and, Fig. 5 is another similar cross section, disclosing a modified form of felly band which I sometimes employ instead of the constructions illustrated in Figs. 3 and 4.

As shown in the drawings, an automobile wheel generally comprises a hub 3, spokes 4, a wooden felly 5, and its metal felly band 6. In said drawings 7 illustrates or represents the tire rim carrying a pneumatic tire 8. Such rims are characterized by a substantially cylindrical body portion 7′ and upwardly and outwardly flared edge portions 7″ terminating in flanges conformed to the tire. It should be understood that the rim 7 is either an endless rim or ring, or if of the transversely split type has its ends metallically secured or tied together to prevent its expansion by the clamping force of the wedges. I have herein shown a split rim of the kind which is described and claimed in my copending application Serial No. 606,992, filed February 6, 1911, in which the metallic bond between the ends of the split rim comprises a plate 7ª and studs or projections 7ᵇ. The valve stem 8ª passes through this plate. The studs 7ᵇ enter holes 5ª in the felly and constitute a driver between the wheel and the rim by which the rim is prevented from slipping or creeping on the wheel. In practice such rims are made of a size to conform to the tire to be carried thereby, whereas the wheel periphery or band is of smaller circumference. In consequence an annular space 9 is left between the wheel and the inner periphery of the rim. It is usual to close this space, on the inner side of the wheel, by means of an annular flange 6′ formed on the felly band 6, which performs the office of supporting the demountable rim 7 at the inner side of the wheel. The words—inner side—as here used, mean the side toward the body of the automobile.

To support the outer side of the rim upon the wheel, and to approximately center it thereon, and to secure it in place upon the wheel it has been customary to use a large number of clamping wedges, like unto the wedge lugs 10, bolted or screwed upon the wheel felly and having points or ends occupying said annular space, on the outer side of the wheel. A serious objection to such arrangement is that the unequal tightening of the clamping wedges throws the rim out of concentricity with the wheel and out of the plane of the wheel, so that the rim is given an irregular and non-circular form and the tire is caused to wabble as the wheel revolves which defects result in undue wear upon the tire and objectionable vibration. Furthermore, the clamping devices employed are expensive and it is obvious that the time required to mount or demount a rim which is held by such devices is directly proportional to the number thereof and that the chances of losing parts thereof likewise increase with their number. I have been able to overcome all of these objections by means of the improvements disclosed in and suggested by the accompanying drawings.

Referring again to the drawings it will be seen that the wedge portions 10' of the clamping devices 10 enter the annular space 9. They are operated by screw bolts 11 and co-acting with the flange 6' they serve to put the rim under tension upon the wheel and hold it against lateral movement thereon. As intimated I use fewer of these clamping devices with the object of reducing the number of points at which the structure must be manually operated or manipulated to clamp and unclamp the demountable rim. Each clamping device 10 consists of a wedge shaped block having a toe or point portion 10' adapted to be forced into the annular space 9 and having its outer face $10^b$ conformed to the beveled portion 7'' of the rim. As here shown the wedging blocks force the rim against the flange 6' and by reason of their beveled faces and that of the flange 6', an expanding or distending pressure is applied to the rim. Thus the rim is firmly seated upon the wheel with the wedges 10' resting upon the felly band to take the lateral strains and help support the rim. For the purpose of obtaining the force necessary to actuate the wedging members, I provide each of them with a bolt 11 which extends through a hole $10^c$ in the shank $10^d$ of the wedging block 10 and works in a nut 12, fixed on the inner side of the wheel. To facilitate the removal of the wedges I employ an inner shoulder or backing sleeve 13 on the bolt. This construction of the wedge lug, as disclosed in Fig. 2 and characterized by the bolt 11, the sleeve 13 and nut 12, is not claimed in this application but is specifically described and is claimed in my co-pending divisional application, Serial No. 636,693, filed July 3rd, 1911. To properly center the rim upon the wheel when it is first placed thereon and to support the several arcs of the rim between the widely separated clamping devices I employ a structure or structures by which the rim and the wheel periphery are placed substantially in metallic contact at points intermediate of the several clamping devices, yet not so tightly as to prevent the easy mounting and demounting of the rim. I prefer to accomplish this effect by providing the rim or the felly band with fixed metallic studs or projections 14, 15 or 16 as indicated in the drawing. I preferably distribute them circumferentially intermediate of the clamping members, which are preferably spaced around the wheel felly at equal distances from each other. As many of the spacers as desired may be used and they may be disposed in any suitable manner around the wheel. These projections or studs support the portions of the rim intermediate of the clamping devices and for supporting the rim and preventing its distortion they are as effective as the clamping wedges and they add no appreciable cost or weight to the wheel. Thus a minimum number of wedge lugs 10 may be used with as many projections or spacers as are necessary to adequately preserve the circularity of the rim. These spacers may consist of broadly tapered heads, studs or projections on the inner periphery of the rim, such as 14 in Fig. 3, or on the felly band as 15 in Fig. 4, or they may be given the form of elongated studs or ribs 16 shown in Fig. 5 and secured in any suitable manner to the rim or felly. While it is evident that the shape, number and the distribution of these centering and supporting studs with respect to the fastening members or wedge lugs is best determined by the particular condition to be met, I prefer to arrange them as shown.

I have secured the best results with studs on the inner periphery of the rim adjacent to its outside edge as shown in Fig. 3. An advantage which I gain in placing the studs at the outer side of the central plane of the rim and wheel is that they are more effective in coöperating with the wedge lugs. Thus the rim is supported in substantially both of its side planes, by the flange 6' on one side and the lugs and the spacers on the other side. These spacers do not require any manipulation whatever in assembling or disassembling the rim and wheel, and in addition to this advantage they materially assist in the assembling operation, particularly if they are made round or broadly tapered, as I have shown in the drawings. I have also found it desirable to make the spacers several thousandths of an inch shorter than the depth of the annular space 9, so that the rim will go on the wheel easily. This difference, however, is negligible in its effect on the circularity of the rim.

The modified constructions represented by Figs. 4 and 5 are not separately claimed in this application but are both described and claimed in my divisional application Serial No. 741,299, filed January 10th, 1913.

Having thus described my invention, I claim as new and desire to secure by Letters Patent:

1. The combination of an automobile wheel and a demountable rim with a driver joining said rim and wheel, clamping lugs circumferentially spaced about said wheel and presenting wedge portions between said rim and wheel, clamping bolts therefor and said rim and wheel being relatively formed to provide circumferentially spaced points of supporting contact for the body of the rim between the several clamping lugs, substantially as and for the purposes specified.

2. The combination of an automobile wheel and a demountable rim with a driver joining said rim and wheel, clamping lugs circumferentially spaced about said wheel and presenting wedge portions between said rim and wheel, clamping bolts therefor, and wheel contacting fixed projections on the inner periphery of said rim circumferentially between the several clamping lugs, substantially as and for the purposes specified.

3. The combination of an automobile wheel and a demountable rim with a driver joining said rim and wheel, clamping lugs circumferentially spaced about said wheel and presenting wedge portions between said rim and wheel, clamping bolts therefor, and wheel contacting beveled projections fixed on the inner periphery of said rim circumferentially between the several clamping lugs, substantially as and for the purposes specified.

4. The combination of an automobile wheel and a demountable rim with a driver joining said rim and wheel, clamping lugs circumferentially spaced about said wheel and presenting wedge portions between said rim and wheel, clamping bolts therefor, and wheel contacting fixed projections on the inner periphery of said rim circumferentially between the several clamping lugs and adjacent to the outer side of the rim and wheel, substantially as and for the purposes specified.

In testimony whereof, I have hereunto set my hand, this 18th day of January, 1911, in the presence of two subscribing witnesses.

ERLE K. BAKER.

Witnesses:
JOHN R. LEFEVRE,
EDGAR F. BEAUBIEN.